United States Patent [19]
Rössler

[11] 3,861,736
[45] Jan. 21, 1975

[54] TRUCK DRIVER PROTECTION SHIELD

[75] Inventor: Heinrich Rössler, Baden-Baden, Germany

[73] Assignee: Daimler-Benz Aktiengesellschaft, Stuggart-Unterturkheim, Germany

[22] Filed: Dec. 1, 1971

[21] Appl. No.: 203,676

[30] Foreign Application Priority Data
Dec. 1, 1970  Germany............................ 2058997

[52] U.S. Cl............................ 296/28 M, 280/150 R
[51] Int. Cl............................................ B62d 33/02
[58] Field of Search .... 296/28 C, 28 M; 280/150 R, 280/150 B; 293/64; 105/5, 374

[56] References Cited
UNITED STATES PATENTS
| | | | |
|---|---|---|---|
| 2,572,477 | 10/1951 | Harden | 293/64 X |
| 3,047,161 | 7/1962 | Thacker | 280/150 R X |
| 3,049,363 | 8/1962 | Marx | 280/150 B |
| 3,493,263 | 2/1970 | Brown | 105/374 X |

FOREIGN PATENTS OR APPLICATIONS
| | | | |
|---|---|---|---|
| 282,241 | 7/1952 | Switzerland | 296/28 M |
| 771,298 | 3/1957 | Great Britain | 296/28 M |

*Primary Examiner*—Robert J. Spar
*Assistant Examiner*—Leslie J. Paperner
*Attorney, Agent, or Firm*—Craig & Antonelli

[57] ABSTRACT

A truck with a driver cab arranged forwardly on the vehicle frame and with a loading surface provided to the rear of the driver cab on a platform body or the like for the payload, in which a protective installation rigidly connected with the vehicle frame is provided between the driver cab and the loading surface which is able to absorb the forces resulting from the platform body and/or payload sliding in the direction toward the driver cab and impinging thereagainst.

8 Claims, 3 Drawing Figures

PATENTED JAN 21 1975 3,861,736

TRUCK DRIVER PROTECTION SHIELD

The present invention relates to a truck with a driver cab arranged forwardly on the chassis frame and with a loading surface on a platform body or the like for the payload provided to the rear of the driver cab.

In trucks the fastening of the parts carrying the payload, for example, of the platform body, on the chassis frame and above all, the fastening of the payload itself cannot be undertaken in all cases in such a manner that in case of a frontal collision the occurring high deceleration forces are safely absorbed. The consequence thereof is that the payload, sometimes also together with the loading platform and body thereof, tears loose, impinges from behind against the driver cab and thereby deforms the same. The passengers of the driver cab are thereby exposed to great injury dangers.

The present invention is concerned with the task to avoid the aforementioned disadvantages. The underlying problems are solved according to the present invention in that a protection installation rigidly connected with the vehicle frame is arranged between the driver cab and the loading surface, which absorbs the loading surface and/or payload sliding in the direction toward the driver cab and impinging thereon.

It is possible by means of the present invention to far-reachingly eliminate damages of the driver cab and therewith to avoid injuries of the passengers in the driver cab.

In an advantageous construction of the subject matter of the present invention, the protection installation may be so constructed that it deforms under the influence of the impinging platform and/or payload while performing form-change work, i.e., deformation work. One achieves in this manner to far-reachingly dissipate the kinetic energy.

The protection installation may consist of an intermediate frame of any suitable construction which is connected with the vehicle frame such as the chassis frame on a wide base. Advantageously this intermediate frame may be arranged at a distance behind the driver cab so that the intermediate frame has space, for example, to bend under the impinging load.

According to a further feature of the present invention, the intermediate frame may have at least half the height of the driver cab.

Accordingly, it is in object of the present invention to provide a truck which eliminates the aforementioned shortcomings and drawbacks encountered in the prior art.

Another object of the present invention resides in a truck which greatly increases the safety of the passengers in the driver cab.

A further object of the present invention resides in a truck which is so constructed that damages to the driver cab and injuries of passengers within the driver cab are far-reachingly eliminated by the provision of a protective installation.

Still another object of the present invention resides in a truck in which the drivers are protected against possible injury due to the forces stemming from a loose payload or a loose loading platform as occur during a front end collision of the truck.

A still further object of the present invention resides in a truck in which forces stemming from a torn-loose payload and/or loading platform are effectively absorbed by dissipating the energy of these forces in the deformation work of the protective installation.

These and further objects, features and advantages of the present invention will become more apparent from the following description when taken in connection with the accompanying drawing which shows, for purposes of illustration only, several embodiments in accordance with the present invention, and wherein.

Figure 1:
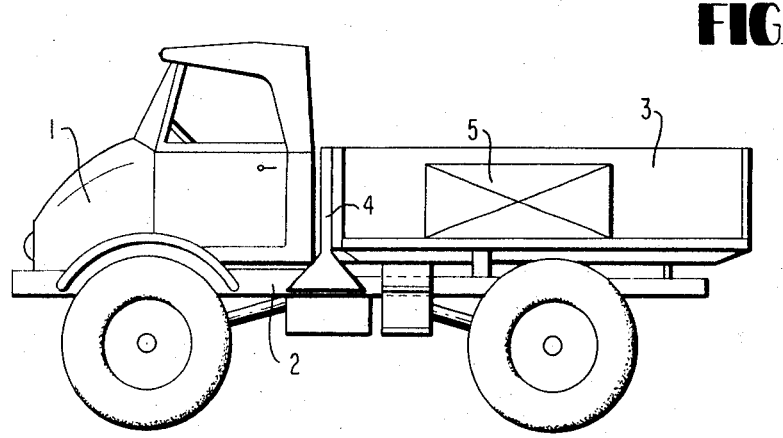
FIG. 1 is a schematic side view of a first embodiment of a truck with a protective installation according to the present invention.

Referring now to the drawing wherein like reference numerals are used throughout the various views to designate like parts, and more particularly to FIG. 1, in the truck illustrated in this figure, in which a driver cab 1 is arranged forwardly on the frame such as the chassis frame of the vehicle 2 and the loading platform 3 to the rear of the driver cab 1, a protective installation 4 is provided between the driver cab 1 and the loading platform 3 which is constructed as intermediate frame and extends up to about half the height of the driver cab 1. The intermediate frame 4 is thereby rigidly connected with the vehicle frame 2 on a wide base by conventional means. The protective installation 4 is itself constructed rigidly to such an extent that in case of a frontal impact of the truck it absorbs the entire impact load caused by the payload 5 and/or the loading platform 3, tearing loose from its mounting, and transmits the impact load to the vehicle frame 2.

Figure 2:
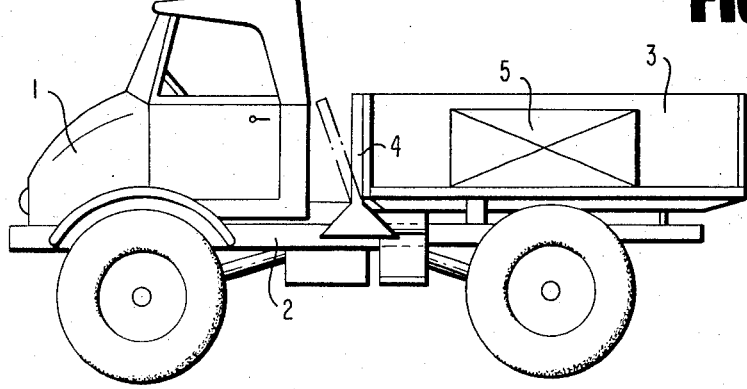
FIG. 2 is a schematic side view of a second embodiment of a truck with a protective installation in accordance with the present invention.

In the arrangement according to FIG. 2, the protective installation 4 is arranged at a distance to the rear of the driver cab 1. The protective installation 4 is thereby so constructed that it dissipates a portion of the kinetic energy occurring during the impact by producing deformation work and transmits the rest of the kinetic energy onto the vehicle frame 2. The deformation of the protective installation 4 caused during an impact by the payload 5 is indicated in dash and dot lines.

Figure 3:
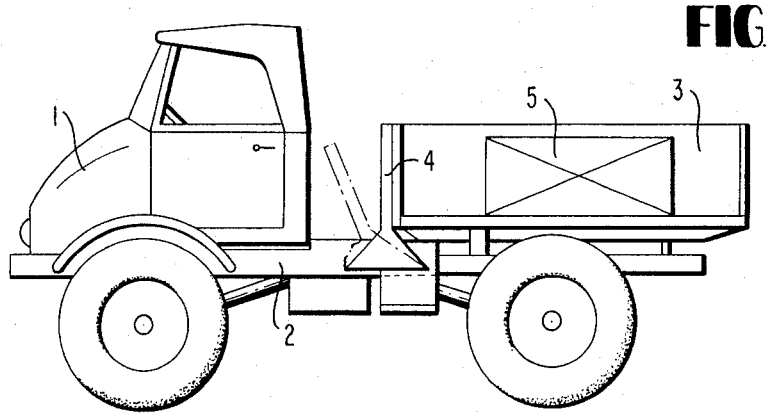
FIG. 3 is a schematic side view of a third embodiment of a truck with a protective installation in accordance with the present invention.

In the embodiment of the arrangement according to FIG. 3, a distance is provided between the protective installation 4 and the driver cab 1 which is larger than in the arrangement according to FIG. 2. The protective installation is, therefore, so constructed that it is able to convert the entire kinetic energy, produced during an impact by the payload 5 and the torn-loose loading platform 3, into deformation work. The deformation protective installation is again indicated in dash and dot lines.

While I have shown and described several embodiments in accordance with the present invention, it is understood that the invention is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A truck comprising: a frame means, a driver cab arranged forwardly on said frame means, a loading surface means for carrying a payload arranged to the rear of said driver cab, and a rigid protective panel means interposed between said driver cab and said loading surface means for absorbing the entire impact load impinging thereon caused by at least one of the payload and the loading surface means when sliding in the direction toward the driver cab during a sudden deceleration, said rigid protective panel means being rigidly connected to said frame means independently of said driver cab and said loading surface means to transmit said impact load to said frame means, said protective panel means including a wide base portion at the bottom end thereof for rigidly connecting said rigid protective panel means to said frame means, said protective panel means being bent in its entirety out of its original position to a second position along said wide base portion upon the application of said impact load upon said protective panel means.

2. A truck according to claim 1, wherein said loading surface means for the payload is a loading platform body.

3. A truck according to claim 1, wherein said protective panel means is constructed as a deformation member being deformed under the influence of at least one of the impinging payload and loading surface means thereby producing deformation work.

4. A truck according to claim 1, wherein said rigid protective panel means is connected to said frame means at a distance to the rear of said driver cab to permit said rigid protective panel means to be displaced to said second position without striking the rear of said driver cab.

5. A truck according to claim 4 wherein said rigid panel means is at least half the height of said driver cab.

6. A truck according to claim 5, wherein said loading surface means for the payload is a loading platform body.

7. A truck according to claim 1, wherein said protective panel means consist of an intermediate frame means connected to said frame means, said intermediate frame means being at least half the height of said driver cab.

8. A truck according to claim 1, wherein said protective panel means absorbs the forces impinging thereon caused by both the payload and the loading surface means.

* * * * *